United States Patent
Bertram et al.

(10) Patent No.: US 7,035,278 B2
(45) Date of Patent: *Apr. 25, 2006

(54) METHOD AND APPARATUS FOR FORMING AND UTILIZING A SLOTTED MPEG TRANSPORT STREAM

(75) Inventors: Michael C. Bertram, San Jose, CA (US); Christopher W. B. Goode, Menlo Park, CA (US); John M. Randall, Freemont, CA (US); Nikhil Rajdev, San Jose, CA (US)

(73) Assignee: Sedna Patent Services, LLC, Philadelphia, PA (US)

(*) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/126,884

(22) Filed: Jul. 31, 1998

(65) Prior Publication Data

US 2002/0064177 A1    May 30, 2002

(51) Int. Cl.
    *H04L 12/43* (2006.01)
(52) U.S. Cl. .................. 370/458; 370/528; 370/537
(58) Field of Classification Search ............ 370/458, 370/459, 465, 468, 470, 471, 477, 503, 535, 370/473, 528, 537
    See application file for complete search history.

(56) References Cited

U.S. PATENT DOCUMENTS

| | | | | |
|---|---|---|---|---|
| 5,652,615 A | * | 7/1997 | Bryant et al. | 348/9 |
| 5,734,589 A | * | 3/1998 | Kostreki et al. | 365/514 |
| 5,859,660 A | * | 1/1999 | Perkins et al. | 348/9 |
| 5,940,738 A | * | 8/1999 | Rao | 455/4.2 |
| 6,169,843 B1 | * | 1/2001 | Lenihan et al. | 386/46 |
| 6,181,712 B1 | * | 1/2001 | Rosengren | 370/474 |
| 6,246,701 B1 | * | 6/2001 | Slattery | 370/503 |
| 6,327,275 B1 | * | 12/2001 | Gardner et al. | 370/535 |

* cited by examiner

*Primary Examiner*—Brian Nguyen
(74) *Attorney, Agent, or Firm*—Patterson & Sheridan LLP

(57) ABSTRACT

A method and apparatus for forming and processing an MPEG transport stream such that programs may be inserted into, or deleted from, the MPEG transport stream without significant retiming operations.

19 Claims, 6 Drawing Sheets

METHOD AND APPARATUS FOR FORMING AND UTILIZING A SLOTTED MPEG TRANSPORT STREAM

The invention relates to information distribution systems and, more particularly, the invention relates to a method of forming and utilizing a slotted MPEG transport stream such that program and/or data packet insertion operations may be performed without significant retiming operations.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

A transport stream comprises one or more programs multiplexed together. A program is a collection of individual elementary streams which share a common time base (i.e., the same 27 MHz clock source). The elementary streams comprise encoded video, audio and other bit streams. The elementary streams may be, but do not have to be, in a packetized elementary stream (PES) format prior to transport multiplexing. A PES consists of a packet header followed by a packet payload. As the elementary streams are multiplexed, they are formed into fixed length transport packets. Typically, a control stream that describes the program is also formed into transport packets and included within the same transport stream as the program.

There are many instances where there is a need to modify or replace one or more programs (or portions of programs) within one or more transport streams. It is important to ensure that modification and/or switching operations are performed in a manner that preserves timing information within the modified or switched programs. If timing information is not preserved, undesirable artifacts (e.g., poor "lip sync" within a subsequently presented program) and/or improper buffer behavior (e.g., decoder or other buffer underflow or overflow) may result.

To preserve timing information, present bitstream switching systems typically utilize remultiplexing techniques. For example, to modify a program within a transport stream, the program to be modified is typically demultiplexed from the transport stream, modified and then remultiplexed into the transport stream. Similarly, to replace a program within a transport stream, the program to be replaced is demultiplexed from the transport stream, and the replacement program is queued up and then multiplexed into the transport stream.

Unfortunately, the above-described remultiplexing technique leads to changes in the relative position of packets within the transport stream. Since some of these packets contain clock data, e.g., transport level program clock reference (PCR), any change in the relative position of packets containing clock data requires a modification to that clock data to reflect a new time of arrival at the target MPEG processor. This clock data is typically updated by "restamping" the PCR clock data during the remultiplexing operation.

The complexity of the above-described demultiplexing, queue management, re-clocking, and multiplexing of the MPEG data requires significant control software and hardware resources. The cost of commercial products that provide such resources are not cost or space effective for applications utilizing a large amount of transport streams, such as video on demand applications.

Thus, it is seen to be desirable to provide a cost effective method and apparatus for multiplexing information streams, such as transport level and/or program level MPEG information streams. More generally, it is seen to be desirable to provide a cost effective method and apparatus for forming and processing an information stream including N information sub-streams such that sub-stream multiplexing and other operations may be performed in a cost effective manner.

SUMMARY OF THE INVENTION

The invention comprises a method and apparatus for forming and processing an information stream such that information sub-streams may be inserted into, or deleted from, the information stream. An information stream formed according to the invention is temporally or bit-wise divided into N information sub-stream slots or service periods having a predetermined size selected to accommodate, e.g., a single information packet. In one embodiment of the invention, an MPEG transport stream having a bitrate BR is temporally divided into N slots, where each slot has associated with it a respective MPEG program having a bitrate of BR/N, each slot includes packets associated with, e.g., video, audio and/or data relating to a single program, such as a movie or television program. Each program may be removed or replaced without impacting the other programs associated with respective other slots within the MPEG transport stream.

Specifically, in an MPEG information distribution system, a method according to the invention for forming a transport stream having a bitrate BR and including one or more programs, comprises the steps of: defining N slots within the transport stream, each of the N slots being associated with a respective plurality of non-contiguous transport packets, each of the respective non-contiguous transport packets being separated by N−1 transport packets; and including, within the transport stream being formed, up to N transport encoded programs, where each transport encoded program is associated with one of the N slots and has a bitrate of BR/N; and in the case of less than N transport encoded programs being included within the transport stream being formed, including NULL transport packets within the transport stream being formed, the NULL packets forming NULL programs within the transport stream being formed.

In another embodiment of the invention, a method according to the invention for inserting a replacement packet into a transport stream formed according to the invention comprises the steps of: (1) examining a packet received from said transport stream to determine if said received packet comprises a NULL packet; (2) inserting, into an output transport stream, said replacement packet if said received packet does comprise a NULL packet; and (3) inserting, into said output transport stream, said received packet if said received packet does not comprise a NULL packet.

In still another embodiment of the invention, a method of replacing a program within a transport stream formed according to the invention comprises the steps of: (1) examining a packet received from said transport stream to determine if a slot associated with said received packet corresponds to an insertion slot for said program to be inserted; (2) inserting, into an output transport stream, a next packet of said replacement program if said slot associated with said received packet corresponds to an insertion slot for said program to be inserted; (3) inserting, into said output transport stream, said received packet if said slot associated with said received packet does not correspond to an insertion slot for said program to be inserted; and (4) repeating steps (1) through (3) for each packet of said transport stream until said replacement stream has been full inserted into said output transport stream.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an MPEG processing system for forming a slotted information stream, and, optionally, inserting or extracting information sub-streams from said slotted information stream. Specifically, the disclosed slotted information stream data structure provides a plurality of fixed time intervals, or packet slots, that define a service period associated with a respective information sub-stream within the slotted information stream. In the exemplary embodiment, each of N information stub-streams within an information stream comprises a program (e.g., image information and related audio information such as a movie or television program) that is transport encoded according to a first clock. The information stream including the sub-streams is transport encoded according to a second clock, where the second clock has a frequency of N times the frequency of the first clock.

The invention provides for the formation of slotted information streams, the insertion of individual packets within such streams and the replacement of programs within such streams. As such, the invention provides a comprehensive approach to program processing and delivery within the context of an MPEG information environment adapted to utilize the slotted information stream apparatus and methods.

Figure 1:
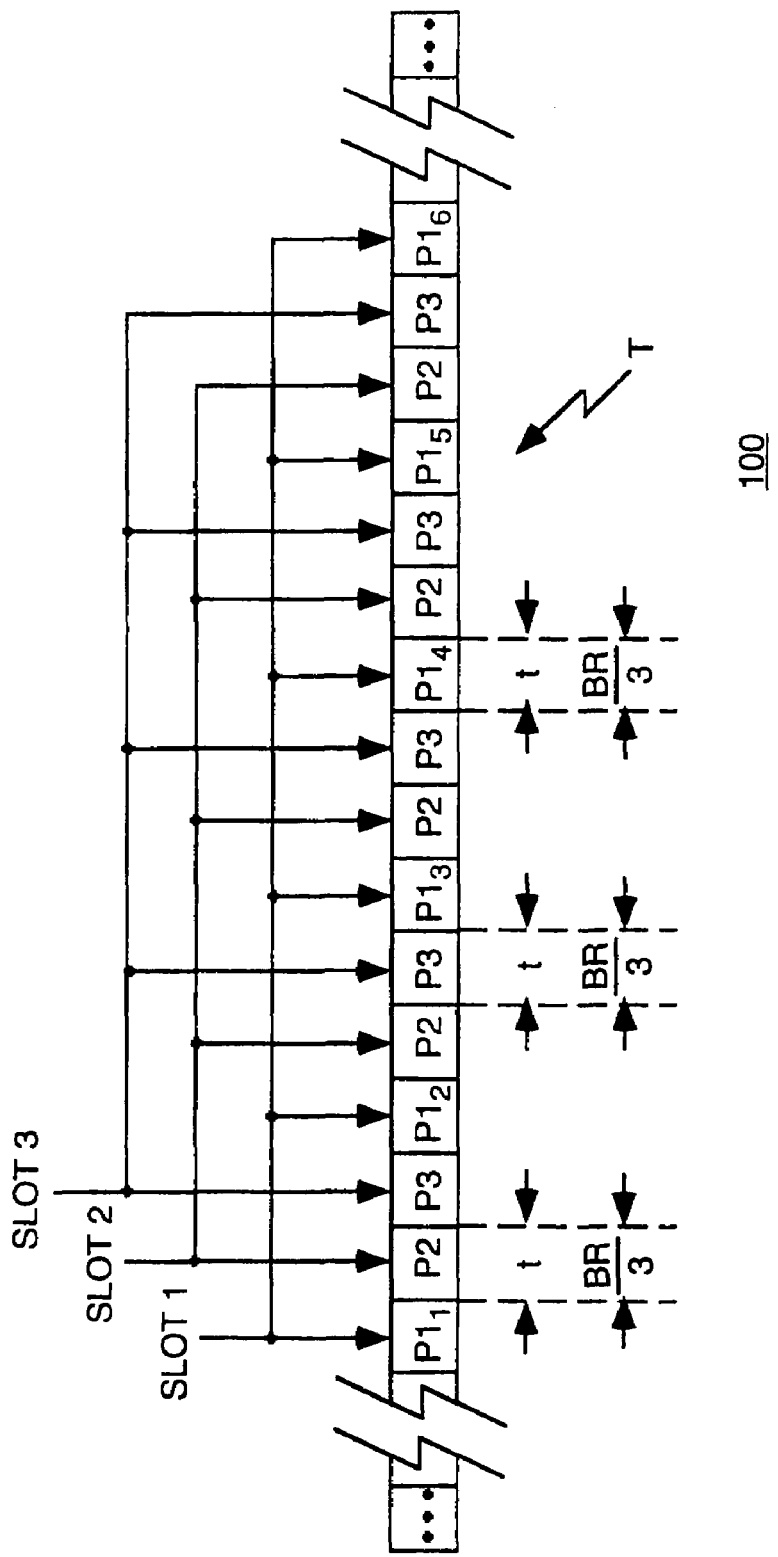
FIG. 1 depicts an information stream formed according to the invention.

FIG. 1 depicts an information stream formed according to the invention. Specifically, FIG. 1 depicts a slotted transport stream (generally denoted as T) including three programs (denoted as P1, P2, and P3). The slotted transport stream T comprises a plurality of substantially fixed length data packets, with each sequential data packet used for alternatingly different programs. That is, a packet associated with program 1 is immediately followed by a packet associated with program 2, which is immediately followed by a packet associated with program 3, which is in turn immediately followed by a packet associated with program 1 (and so on). Thus, a bit rate BR associated with the slotted transport stream T is divided in a substantially equal manner among N, illustratively three, included programs such that each of the three programs within the slotted transport program T has a bit rate of BR divided by 3.

The slotted transport stream T described above with respect to FIG. 1 advantageously allows the processing of programs (i.e., slotted sub-streams) without significant retiming operations, such as adjustments to a program clock reference (PCR). This is because the relative position of each packet associated with a particular program remains the same with respect to the other packets within the program. Thus, one program will not be affected by modifications made to another program, as long as the modifications do not affect the relative position of the packets in the one program.

Consider the case of program P1, which is depicted In FIG. 1 as occupying slot one. Referring to FIG. 1, six packets associated with program P1 (denoted as $P1_1$ through $P1_6$) are shown. The transport encoder forming the slotted transport stream T has processed the necessary timing information within the program P1 (e.g., time stamped and/or time referenced the packets forming the program P1). Thus, since each packet of program P1 is separated from the nearest packet of program P1 by two packet lengths (i.e., a packed associated with program P2 and a packet associated with program P3), the temporal processing imparted to the program during the encoding of the slotted transport stream T has taken into account this fixed packet "distance." Therefore, regardless of the contents of program P2 and/or program P3, program P1 will decode properly as long as two packet lengths separate each packet associated with program P1.

It should be noted that the number of slots within a transport stream is determined by the relationship between the transport stream clock (i.e., the transport data rate) and the program encoding clocks (i.e., the program data rate). For example, where a transport stream having a 26.97 MHz clock rate is used to carry eight programs (i.e., N=8), each program is encoded using a 3.37125 MHz clock. In this case, each program to be included in the transport stream is transport encoded using a clock having a frequency of programs that are transport encoded.

Figure 2:
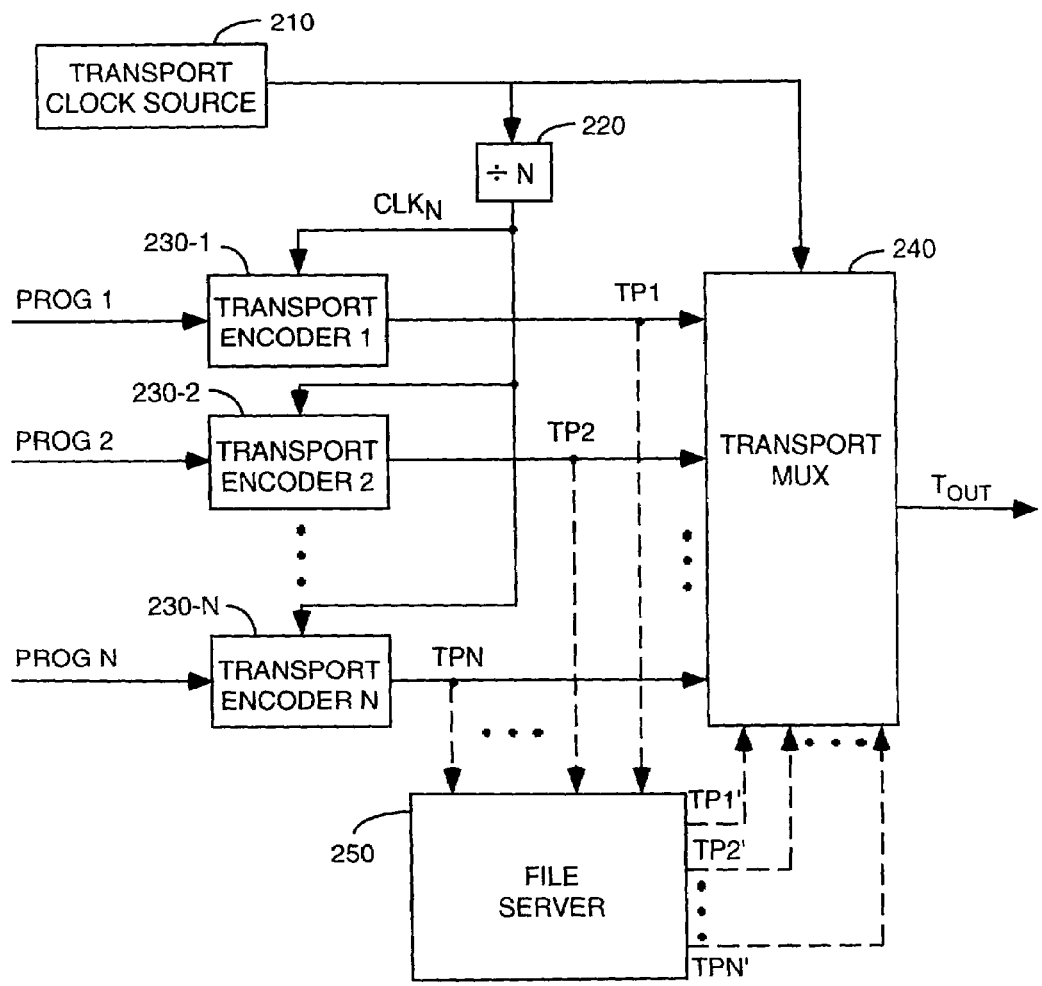
FIG. 2 depicts an apparatus for generating information streams according to the invention.

FIG. 2 depicts an apparatus 200 for generating information streams according to the invention. Specifically, the apparatus 200 of FIG. 2 receives and processes a plurality of programs (PROG1–PROGN), to produce a slotted transport stream ($T_{OUT}$), such as described above with respect to FIG. 1. Each of the programs comprises, illustratively, a video, audio and/or auxiliary data elementary or packetized elementary streams (e.g., a movie or television program including closed caption or other data services). It should be noted that the programs have been previously encoded by video, audio and/or data encoders (not shown). That is, in an embodiment of the invention adapted to processing MPEG information streams, the video and audio streams within the program are MPEG compressed video and audio streams.

The apparatus 200 comprises a transport clock source 210, a frequency divider 220, a plurality of transport encoders 230-1 through 230-N, a transport multiplexer 240 and an optional file server 250.

Transport clock source 210, illustratively, a 26.97 MHz MPEG system or transport clock source provides a timing signal CLK to the frequency divider 220 and the transport multiplexer 240. Frequency divider 220 divides the timing signal CLK by N to produce timing signal $CLK_N$ that is coupled to each of the plurality of transport encoders 230-1 through 230-N.

Each of the plurality of transport encoders 230-1 through 230-N receives and transport encodes a respective program PROG1–PROGN to produce respective transport encoded programs streams $T_{PROG1}$–$T_{PROGN}$. The transport encoded programs streams $T_{PROG1}$–$T_{PROGN}$ are coupled to the transport multiplexer 240 and, optionally, the file server 250.

Transport multiplexer 240 sequentially multiplexes one transport packet from each of the transport encoded programs streams $T_{PROG1}$–$T_{PROGN}$ to form multiplexed transport stream $T_{OUT}$. That is, multiplexed transport stream $T_{OUT}$ comprises a slotted transport stream including N programs, such as described above with respect to FIG. 1. As previously noted, the number of slots within a transport stream is determined by the relationship between the transport stream clock (i.e., the transport data rate) and the program encoding clocks (i.e., the program data rate). Thus, in the apparatus 200 of FIG. 2, if N=8 then the timing signal $CLK_N$ comprises a 3.37125 MHz clock and each packet of a program within slotted transport stream $T_{OUT}$ is separated from a respective contiguous program packet by 7 intervening packets.

Optional file server 250 is used to store the transport encoded programs streams $T_{PROG1}$–$T_{PROGN}$ for subsequent transport multiplexing and delivery to, e.g., a subscriber in an information distribution system. For example, if a subscriber in the information distribution system requests a particular move, the file server 250 retrieves and couples to the transport multiplexer the transport encoded program associated with the particular movie. The transport multiplexer inserts the retrieved program into an appropriate slot within the slotted transport stream for delivery to the subscriber. The subscriber receives information identifying which slot within which slotted transport stream includes the requested movie. The subscriber extracts (and optionally decrypts) the transport packets within the identified slot such that the transport encoded requested program is received by the subscriber. The received program is subsequently decoded and presented in the appropriate manner on, e.g., the subscriber's television.

The above-described apparatus 200 is capable of forming a slotted transport stream $T_{OUT}$ comprising N programs. However, there is no requirement that N programs be included within the slotted transport stream $T_{OUT}$. If there are fewer than N programs to be included in the slotted transport stream $T_{OUT}$, then NULL packets are inserted into the slot(s) that are not associated with a program. That is, a NULL program is formed for each slot that is not associated with a program. A NULL packet comprises a syntactically correct transport packet having little or no useful information in its payload portion. A NULL packet will be ignored by a far end decoder. However, the purpose of a NULL packet is to preserve the distance relationship between consecutive packets of program streams within the slotted transport stream $T_{OUT}$. Additionally, NULL packets within a slotted transport stream may be replaced by data or other transport packets on an opportunistic basis. That is, if data is to be transmitted to a particular subscriber, NULL packets within a slotted transport stream received by the subscriber may be used to carry the data to the subscriber.

Figure 3:
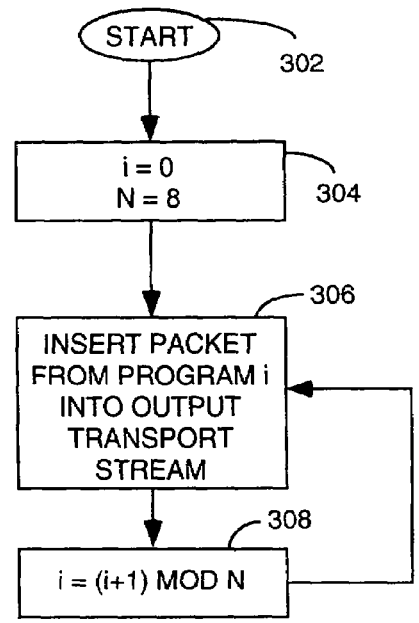
FIG. 3 depicts a flow diagram of a routine for forming a transport stream according to the invention and suitable for use in the apparatus in FIG. 2.

FIG. 3 depicts a flow diagram of a routine 300 for forming a transport stream according to the invention and suitable for use in the apparatus in FIG. 2. The transport stream formation routine 300 is entered at step 302 when, e.g., transport multiplexer 240 of FIG. 2 begins receiving transport encoded programs $T_{P1}$ through $T_{PN}$. The routine 300 then proceeds to step 304, where a counter variable i is initialized to zero, and a slot number identification variable N is said equal to 8. The routine 300 then proceeds to step 306.

At step 306, a packet from the program stream denoted by the variable i (i.e., transport encoded program stream $T_{Pi}$) is inserted into the output transport stream $T_{OUT}$. The routine 300 then proceeds to step 308, where the counter variable i is incremented by one and subjected to a modulo N operation, in this case a modulo 8 operation, where the counter variable i is incremented by 1, and incremented counter value is modulo operated upon by the variable N (i.e., the counter variable i is incremented by one until it reaches N, at which time it is reset to zero). The routine 300 then proceeds to step 306, where a packet from the next transport encoded program (i.e., $T_{Pi}$) is inserted into the output transport stream $T_{out}$. This process is repeated until all the programs are included within the output transport stream $T_{out}$. In the event of one or more transport encoded programs not being present (i.e., less than ten transport encoded programs), NULL packets are inserted into the output transport stream $T_{OUT}$.

Figure 4:
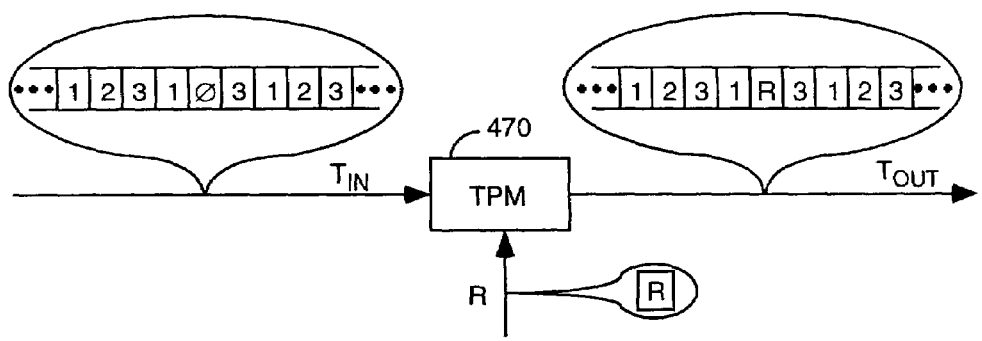
FIG. 4 depicts a transport stream multiplexer suitable for inserting one or more packets into a transport stream formed according to the invention.

FIG. 4 depicts a transport stream multiplexer suitable for inserting one or more packets (not necessarily associated with a specific program) into a slotted transport stream according to the invention.

Specifically, a transport stream multiplexer 470 is shown receiving an input transport stream $T_{IN}$, illustratively a slotted transport stream, and a replacement transport packet (or replacement transport packet stream) R. The transport stream multiplexer 470 receives and examines each packet of the input transport stream $T_{IN}$. If a received packet is not a NULL packet, then the received packet is coupled to an output as part of an output transport stream $T_{OUT}$. If a received packet is a NULL packet, and if a replacement packet R is to be inserted into the output stream, then the replacement packet R is inserted into the output as part of the output transport stream $T_{OUT}$, instead of the NULL packet. In this manner, packets are inserted into the output transport stream $T_{OUT}$ without modifying the previously established timing and distance relationships of the existing packets (i.e., the packets present in the input transport stream $T_{IN}$).

Figure 5:
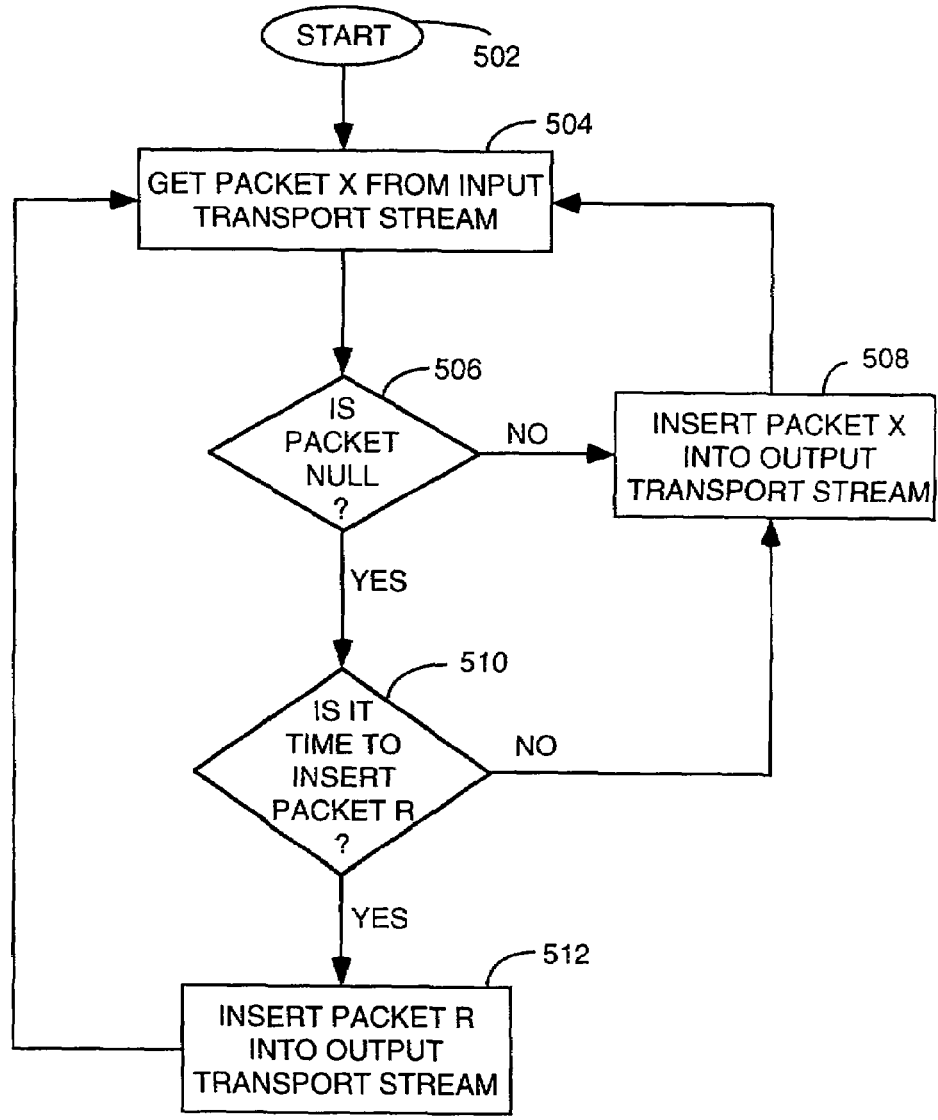
FIG. 5 depicts a flow diagram of a routine for inserting individual packets into an MPEG transport stream formed according to the invention.

FIG. 5 depicts a flow diagram of a routine 500 for inserting individual packets into an MPEG transport stream formed according to the invention. Specifically, the packet insertion routine 500 monitors a slotted transport stream and, upon detection of a NULL packet within that transport stream, inserts a replacement packet into that transport stream in place of the NULL packet.

The routine 500 is entered at step 502 when a slotted transport stream T is received by, e.g., transport multiplexer 470 of FIG. 4. As previously noted, with respect to FIG. 4, a slotted transport stream T formed according to the invention comprises three slots and, as depicted in FIG. 4, at least one packet within one slot comprises a NULL packet. The transport multiplexer 470 senses the presence of a NULL packet and responsively inserts a replacement package R into the received transport stream such that the NULL packet is replaced by the replacement packet, thereby forming an output transport stream out including the replacement packet. The routine 500 then proceeds to step 504.

At step 504 a packet is retrieved from the input transport stream $T_{in}$ coupled to the transport stream multiplexer 470. The routine 500 proceeds to step 506, where the received packet is examined and a query is made as to whether the received packet is a NULL packet. If the query at step 506 is answered negatively, then the routine 500 proceeds to step 508, where the received packet is inserted into the slotted output transport stream $T_{out}$. Routine 500 then proceeds to step 504, where the next packet within the slotted input transport stream $T_{in}$ is received.

If the query at step 506 is answered affirmatively, then the routine 500 proceeds to step 510, where a query is made as to whether it is time to insert the replacement packet R into the slotted output transport stream. If the query at step 510 is answered affirmatively, then the routine 500 proceeds to step 512, where the insertion packet R is inserted into the transport stream $T_{out}$ in place of the NULL packet. The routine 500 then proceeds to step 504. If the query at step 510 is answered negatively, then the routine proceeds to step 508.

Figure 6:
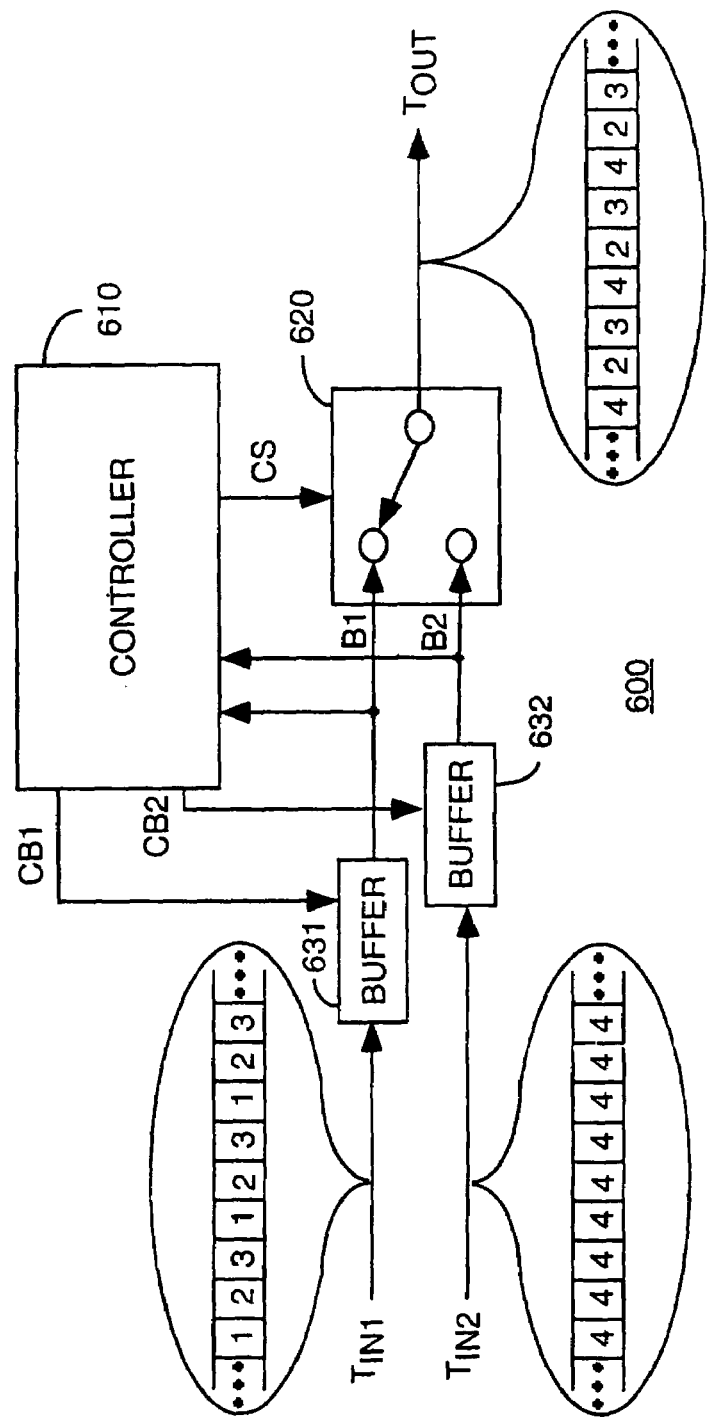
FIG. 6 depicts a transport stream multiplexer suitable for inserting a program stream into a transport stream formed according to the invention.

FIG. 6 depicts a transport stream multiplexer 600 suitable for inserting a program stream into a transport stream formed according to the invention. Specifically, the transport stream multiplexer 600 comprises a controller 610, a switch 620 and a pair of memory buffers 631 and 632. It should be noted that the transport stream multiplexer 600 of FIG. 6 and transport stream multiplexer 400 of FIG. 4 may be interchanged, since both transport multiplexers are suitable for multiplexing operations at the packet and/or program level.

Referring now to FIG. 6, a first transport stream $T_{IN1}$ is buffered by a first memory buffer 631 to form a first buffered transport stream B1, while a second transport stream $T_{IN2}$ is buffered by a second memory buffer 632 to form a second buffered transport stream B2. The first buffered transport stream B1 and the second buffered transport stream B2 are each coupled to respective inputs of the controller 610 and the switch 620.

First transport stream $T_{IN1}$ comprises a slotted transport stream formed in accordance with the invention and having 3 slots (i.e., N=3). It can be seen in FIG. 6 that packets associated with a first (1), second (2) and third (3) program are located in an alternating fashion. Second transport stream $T_{IN2}$ comprises a transport stream having a single program, denoted as a fourth (4) program. Importantly, the timing relationships between successive packets within the fourth program have been formed as if the fourth program is part of an N=3 slotted transport stream. In this manner, the fourth program may be stored in, e.g., a file server such as file server 250 of the apparatus 200 of FIG. 2 and immediately retrieved and multiplexed (without retiming) into an existing transport stream (such as first transport stream $T_{IN1}$).

Controller 610, in response to the two buffered transport streams B1 and B2, produces a first buffer control signal CB1, a second buffer control signal CB2 and a switch control signal CS.

First memory buffer 631 and second memory buffer 632, in response to respective first buffer control signal CB1 and second buffer control signal CB2, adapt the flow of their respective buffered output streams.

Switch 620, in response to the switch control signal CS, selectively couples to an output a packet from one of the first buffered transport stream B1 and the second buffered transport stream B2 to produce an output transport stream $T_{OUT}$. In the exemplary embodiment of FIG. 6, the output transport stream comprises the second (2), third (3) and fourth (4) programs. Thus, the controller 610 causes the switch 620 to select the slot one packet from the second buffered output stream B2, and the slot two and three packets form the first buffered output stream B1. In this manner, the fourth program (4) of second transport stream $T_{IN2}$ is merged with the second (2) and third (3) programs of first transport stream $T_{IN1}$ to form the output transport stream $T_{OUT}$.

Figure 7:
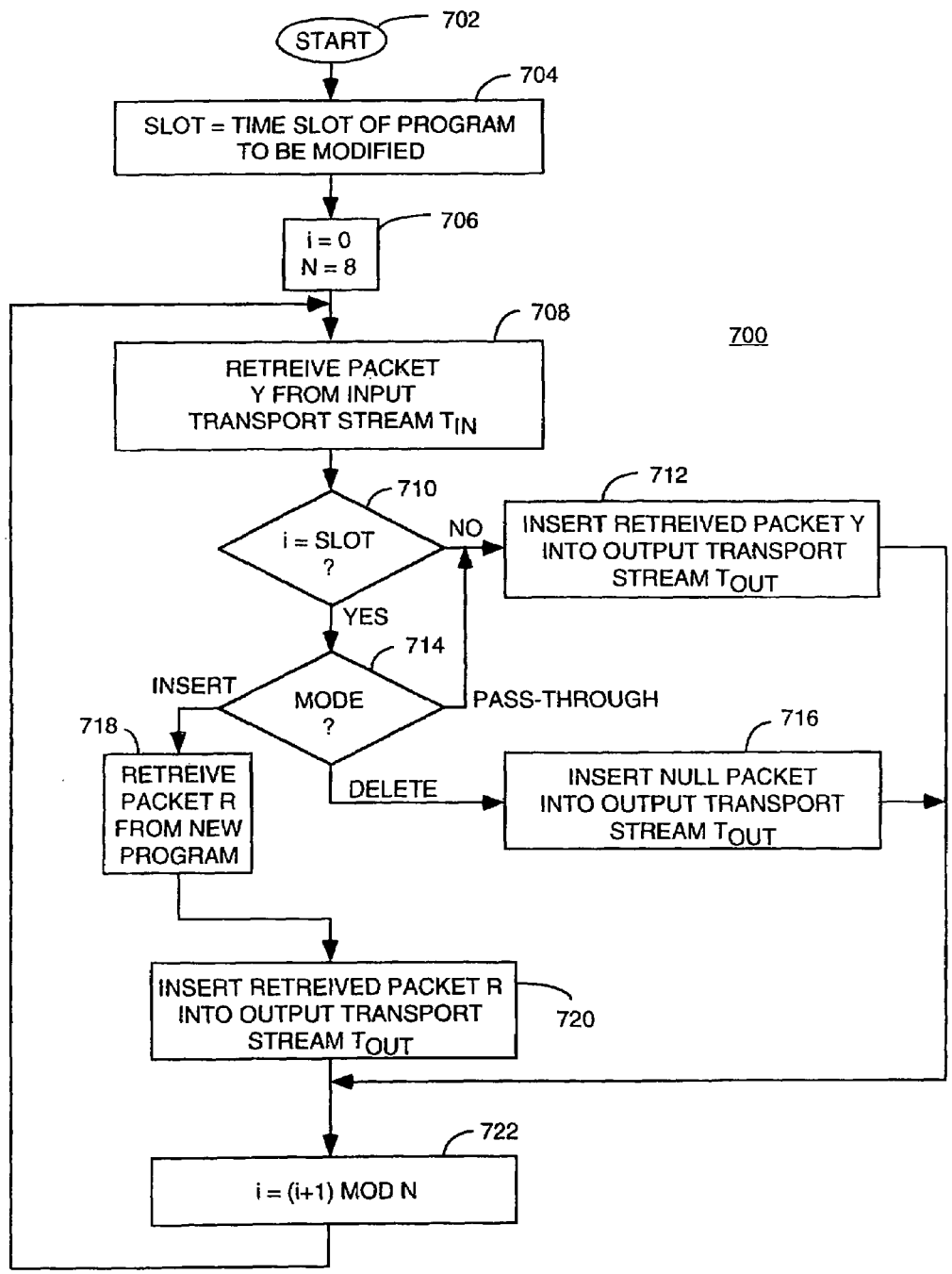
FIG. 7 depicts a flow diagram of a routine for processing a transport stream including a plurality of programs according to the invention.

FIG. 7 depicts a flow diagram of a routine 700 for processing a transport stream including a plurality of programs according to the invention. Specifically, the routine 700 processes an input transport stream T by selectively modifying packets associated with a particular time slot (i.e., a particular program within the input transport stream T) to produce an output transport stream OUT. That is, each packet associated with a particular program may be passed to the output transport stream OUT without modification (pass through mode), may be replaced with a null packet (delete mode) or may be replaced by a packet associated with a new program (replace mode).

The routine 700 is entered at step 702 when an input transport stream IN is received by, e.g., transport processing module and proceeds to step 704. At step 704 a variable SLOT is set equal to the time slot of a program to be modified within a transport stream. In the exemplary embodiment, a transport stream is divided into N service periods or slots, illustratively eight slots. The routine 700 then proceeds to step 706, where a counter variable I is initialized to zero and a variable N is initialized to 8. The variable N indicates the number of slots within the transport stream. The routine 700 then proceeds to step 708.

At step 708 a packet (Y) is retrieved from the input transport stream (T). The routine then proceeds to step 710, where a query is made as to whether the counter variable I is equal to the slot of the program to be modified. If the query at step 710 is answered negatively, then the routine 700 proceeds to step 712, where the packet (Y) retrieved from the input transport stream (T) is inserted into the output transport stream (O). The routine 700 then proceeds to step 722.

If the query at step 710 is answered affirmatively, then the routine 700 proceeds to step 714, where a query is made as to whether a packet should be inserted or deleted. That is, should a program be inserted into the time slot denoted by the variable slot within transport stream T, or should a null packet be inserted into that slot (thereby deleting a program within that slot). If the answer to the query at step 714 indicates that a program should be deleted, then the routine 700 proceeds to step 716 where a null packet is inserted into the output transport stream (O). The routine 700 then proceeds to step 722.

If the answer to the query at step 714 indicates that a program is to be inserted, then the routine 700 proceeds to step 718, where a packet (R) from a new program (i.e., the program to be inserted) is retrieved. The routine 700 then proceeds to step 720 where the packet (R) retrieved from the new program is inserted into the output transport stream (OUT). The routine 700 then proceeds to step 722.

At step 722, the counter variable i is incremented by 1, and incremented counter value is modulo operated upon by the variable N (i.e., the counter variable i is incremented by one until it reaches 8, at which time it is reset to zero). The routine 700 then proceeds to step 708 where the next packet (Y) associated with the time slot (SLOT) is retrieved from the input transport stream (T).

It is important to note a major distinction between the apparatus 400 of FIG. 4 and the apparatus 600 of FIG. 6.

Specifically, the apparatus 400 of FIG. 4 is directed toward inserting one or more individual packets into an MPEG transport stream formed according to the invention by replacing NULL packets upon detecting a NULL packet within the transport stream. By contrast, the apparatus 600 of FIG. 6 is directed toward replacing all the packets within a particular slot, whether NULL packets or existing program packets, with a sequence of packets comprising a program. Thus, the approach of FIG. 4 (and the method of FIG. 5) may be more appropriate for the delivery of information that is not time critical in terms of timing synchronization and related issues. By contrast, the approach of FIG. 6 (and the method of FIG. 7) may be more appropriate for the delivery of information, such as programs, that is time critical in terms of such timing synchronization and related issues.

It should be noted that the functionality depicted as apparatus in FIG. 2 and FIG. 4 may be implemented entirely or partially in software. This is because the process of generating, multiplexing or otherwise processing a slotted transport stream may be performed rapidly such that software implementations of those processing operations requiring real time speed may be accomplished using a sufficiently powerful computer having an associated memory and input/output support structure. In addition, since the slotted transport streams of the invention are of fixed length, the computational load on a processor manipulating such slotted transport streams is manageable, though those skilled in the art will appreciated that appropriate stream buffering may be necessary.

It is important to note that while the invention has been described primarily in terms of hardware, the invention may be implemented using hardware, software or a combination of hardware and software. Moreover, while the invention is described within the context of processing a video information stream (e.g., an MPEG stream) to produce a video of audio-video information sub-stream, the invention may be practiced using other types of information streams and for other purposes.

The above-described invention provides rapid, cost-effective storage, processing, switching and, generally, delivery of programs to, e.g., a plurality of subscribers. For example, the invention may be utilized within the context of an interactive digital video on demand (VOD) service known as the OnSet™ system, manufactured by DIVA Systems Corporation of Menlo Park, Calif. The OnSet™ system distributes audio-visual information to individual subscribers utilizing MPEG information streams. The OnSet™ system also allows subscribers to interactively control the delivery of audio-visual information using consumer-friendly commands, such as fast-forward (FF), rewind (REW), pause (PAUSE), play (PLAY) and the like. Within the context of the OnSet™ system, the invention is used to efficiently utilize an available bandwidth within the system such that a maximal number of subscribers are provided with information (e.g., data, movies and the like) in a relatively fair manner (e.g., bandwidth degradation is felt evenly by all subscribers, not just particular classes of subscribers such as low priority/low bandwidth subscribers.

As discussed above with respect to FIG. 6, pre-formed programs may be retrieved from, e.g., a file server and multiplexed into a transport stream without performing any retiming operations. This is possible where the preformed program comprises a sequence of transport packets that have been processed in a manner adapting the timing information within the packet headers to the slot structure (e.g., N=8) of the target transport stream. In this manner, preformed programs comprise "drop in" or replacement programs suitable for use in an existing slotted information stream environment.

Additionally, the invention provides an efficient mechanism for forming and processing programs (e.g., switching, storing, retrieving and other information preparation and delivery functions), such that common, fixed packet communication systems may be employed to provide enhanced services to subscribers within the OnSet™ system. However, it should be noted that while the invention is advantageously employed within the context of a video on demand system, other information processing and distribution systems may benefit from the invention.

In another application, the above-described invention is capable of performing minor rate adjustments on the transport stream. Specifically, by adding NULL packets or removing program packets in an original transport stream (e.g., the input transport stream $T_{IN}$, $T_{IN1}$ or $T_{IN2}$) at a set rate, the rate of a resulting transport stream (e.g., the output transport stream $T_{OUT}$) can be controllably adjusted to within the clock tolerances allowed by the devices processing the stream (e.g., transport multiplexer 470 or 600). The insertion or deletion of packets allows the output transport stream (e.g., $T_{OUT}$) to be clocked out of the transport multiplexer (e.g., 240 or 600) at a rate different from the rate at which the input transport stream (e.g., $T_{IN}$, $T_{IN1}$ or $T_{IN2}$) is received. For example, if an input transport stream has a bitrate of 27 Mbps and one NULL packet (e.g., 1504 bits) is inserted every 10 second, the resulting output transport stream will have a bitrate of 27.0001504 Mbps. To implement this rate adaptation process, a determination is made as to how many NULL packets are to be inserted into a transport stream over a period of time, a slot repetition period, a packet count period or other temporally related stream indicium. The NULL packets are then inserted at the determined rate or insertion interval to effect the desired change in bitrate of the transport stream.

For example, in the case of, e.g., a first slot including an indication of the start of a series of slots, the insertion of a NULL packet prior to the first slot will not adversely impact transport stream receivers that extract programs based on a packet offset (i.e., slot offset) from the first slot.

Although various embodiments which incorporate the teachings of the present invention have been shown and described in detail herein, those skilled in the art can readily devise many other varied embodiments that still incorporate these teachings.

What is claimed is:

1. A method for forming an output transport stream for transporting a plurality of encoded programs having a common time base indicated by periodically inserted time stamps provided by a received transport stream, said method comprising:

storing, in a file server, the plurality of encoded programs;

defining a plurality of timeslots within said output transport stream, wherein each timeslot is associated with one of the encoded programs;

including the encoded programs within the associated timeslots of the output transport stream, in response to subscriber requests for the encoded programs, by including transport packets associated with each of the encoded programs within the associated timeslots within said output transport stream in a manner for maintaining a fixed number of timeslots between consecutive transport packets associated with each of the encoded programs;

identifying, for the requesting subscribers, respective timeslots including the requested encoded programs; and transmitting said output transport stream;

wherein the encoded programs in the output transport stream have said common time base indicated by said periodically inserted time stamps provided by said received transport stream.

2. The method of claim 1, further comprising:

modifying transport packets associated with one of the plurality of timeslots to produce a modified transport stream;

wherein said modifying comprises replacing said transport packets associated with said one of the plurality of timeslots with other packets.

3. The method of claim 2, wherein the transport packets associated with the one of the plurality of timeslots represent a first program from the plurality of encoded programs and the other packets represent a second program from the plurality of encoded programs.

4. The method of claim 3, wherein one of said first and second programs comprises a NULL program.

5. The method of claim 3, wherein the step of modifying transport packets further comprises:

(1) examining a packet received from said received transport stream to determine if a slot associated with said received packet corresponds to an insertion slot for said second program to be inserted;

(2) inserting, into the output transport stream, a next packet of said second program if said slot associated with said received packet corresponds to an insertion slot for said second program to be inserted;

(3) inserting, into said output transport stream, said received packet if said slot associated with said received packet does not correspond to an insertion slot for said second program to be inserted; and (4) repeating steps (1) through (3) for each packet of said received transport stream until a replacement stream has been fully inserted into said output transport stream.

6. The method of claim 1, wherein a bitrate of said output transport stream is adjusted by deleting transport packets and inserting NULL transport packets within said output transport stream.

7. The method of claim 6, wherein a number of NULL transport packets to insert is determined according to at least one of an insertion rate, a slot repetition period and a packet count.

8. The method of claim 6, wherein a number of transport packets to delete is determined according to at least one of an deletion rate, a slot repetition period and a packet count.

9. An apparatus for processing a received transport stream comprising N time slots for transporting therein N respective programs having a common time base indicated by periodically inserted time stamps, where N is an integer greater than one, said apparatus comprising:

a transport clock source;

a frequency divider for dividing a timing signal from said transport clock source into N timing signals;

N transport encoders coupled to said frequency divider for respectively receiving and encoding said N programs to produce N encoded program streams in response to subscriber requests for the N programs, each of the N encoded program streams including a plurality of program transport packets;

a file server coupled to the N transport encoders for storing the N encoded program stream; and a multiplexer, coupled to the file server, for receiving the program transport packets of the N encoded program streams, said multiplexer inserting said program transport packets into timeslots of an output transport stream, wherein each timeslot of the output transport stream is associated with one of the N encoded program streams such that each timeslot of the output transport stream is adapted for transporting program transport packets associated with the N encoded program streams in a manner for maintaining a fixed number of timeslots between consecutive program transport packets associated with each of the N encoded program streams, wherein respective timeslots including the requested N programs are identified for the requesting subscribers;

wherein said programs have said common time base indicated by said periodically inserted time stamps provided by said received transport stream.

10. The apparatus of claim 9, wherein each of the N encoded program streams is encoded at a clock rate of CLK/N, wherein CLK comprises a clock rate of the timing signal from the transport clock source.

11. The apparatus of claim 9, further comprising:

a modification module coupled to the multiplexer, for modifying program transport packets associated with one of the timeslots of the output transport stream to produce a modified transport stream by replacing program transport packets associated with one of the timeslots of the output transport stream with other packets.

12. The apparatus of claim 11, wherein initial and replacement packets associated with the one of the timeslots of the output transport stream represent respective first and second programs.

13. An apparatus for processing a received transport stream comprising a plurality of timeslots for transporting therein a respective plurality of programs having a common time base indicated by periodically inserted time stamps, said apparatus comprising:

a transport clock source;

a frequency divider, for dividing a transport clock timing signal from said transport clock source into a plurality of timing signals; and a plurality of encoders, each of said encoders coupled to said frequency divider for respectively receiving and encoding said plurality of programs to produce respective encoded program streams, each of the encoded program streams including respective pluralities of program transport packets, each of said encoded program streams being coupled to a switch via a file server;

said file server storing the encoded program streams and selectively providing the encoded program streams to the switch in response to subscriber requests for the encoded program streams;

said switch inserting program transport packets of the respective encoded program streams from said file server into timeslots of an output transport stream, wherein each timeslot of said output transport stream is associated with a different one of the plurality of encoded program streams such that each timeslot of the output transport stream is adapted for transporting program transport packets associated with each of the encoded program streams in a manner for maintaining a fixed number of timeslots between consecutive program transport packets associated with each of the encoded program streams, wherein respective timeslots including the requested encoded program streams are identified for the requesting subscribers;

wherein said programs have said common time base indicated by said periodically inserted time stamps provided by said received transport stream.

14. The apparatus of claim 13, wherein a bitrate of each encoded program stream is adapted by adding NULL packets to the output transport stream.

15. The apparatus of claim 14, wherein a number of NULL packets to add is determined according to at least one of an insertion rate, a slot repetition period and a packet count.

16. The apparatus of claim 13, wherein a bitrate of an encoded program stream is adapted by deleting program transport packets from the encoded program stream.

17. Apparatus for generating a transport stream comprising a plurality of programs, each of said programs having associated with it a respective time slot, said apparatus comprising:

a frequency divider, for dividing a transport clock timing signal into a plurality of timing signals; and a plurality of encoders, each of said encoders encoding a program stream from a received transport stream, in response to a respective timing signal, to produce a respective encoded program stream, each of said encoded program streams being coupled to a switch via a file server;

said file server storing the encoded program streams and selectively providing the encoded program streams to the switch in response to subscriber requests for the encoded program streams;

said switch selectively inserting program transport packets of the respective encoded program streams from said file server into timeslots of a slotted transport stream, wherein each timeslot of the slotted transport stream is associated with a different one of the plurality of encoded program streams such that each timeslot of the slotted transport stream is adapted for transporting program transport packets associated with each of the encoded program streams in a manner for maintaining a fixed number of timeslots between consecutive program transport packets associated with each of the encoded program streams, wherein respective timeslots including the requested encoded program streams are identified for the requesting subscribers; and said switch selectively inserting other transport packets from said file server in place of the program transport packets associated with a desired time slot to modify said slotted transport stream, said modified slotted transport stream including respective modified programs having a common time base indicated by periodically inserted time stamps provided by said received transport stream.

18. The apparatus of claim 17, wherein said desired time slot comprises an unused time slot.

19. The apparatus of claim 18, wherein said unused time slot includes NULL transport packets.

* * * * *